United States Patent

[11] 3,571,731

| [72] | Inventors | Richard E. Rabe<br>Rte 3, Rome;<br>Ronald J. Covello, 2411A Snark St.,<br>Griffiss AFB, N.Y. 13340 |
|---|---|---|
| [21] | Appl. No. | 802,077 |
| [22] | Filed | Feb. 25, 1969 |
| [45] | Patented | Mar. 23, 1971 |

[54] HIGH-SPEED SYNCHRONOUS SAMPLER CONTROL TIMER
2 Claims, 2 Drawing Figs.

[52] U.S. Cl. .................................................. 328/131, 307/293, 317/140
[51] Int. Cl. ............................................... G01r 29/02, H03k 5/00
[50] Field of Search ....................................... 307/293; 328/129—131; 317/137—140

[56] References Cited
UNITED STATES PATENTS

| 3,327,224 | 6/1967 | Mauchel | 328/129X |
| 3,406,295 | 10/1968 | Corey | 307/293X |

*Primary Examiner*—Stanley D. Miller, Jr.
*Attorneys*—Harry A. Herbert, Jr. and Henry S. Miller, Jr.

ABSTRACT: A synchronous timer that counts input pulses - and operates a connected device when a preselected count is reached. The timer contains voltage control circuitry, a binary logic circuit, a coincident gate and switch for preselecting the number of pulses, a multivibrator connected to the coincident gate, a reset circuit for automatically returning the count to zero after the preselected count is reached and a relay circuit connected to the coincident gate to operate the connected device.

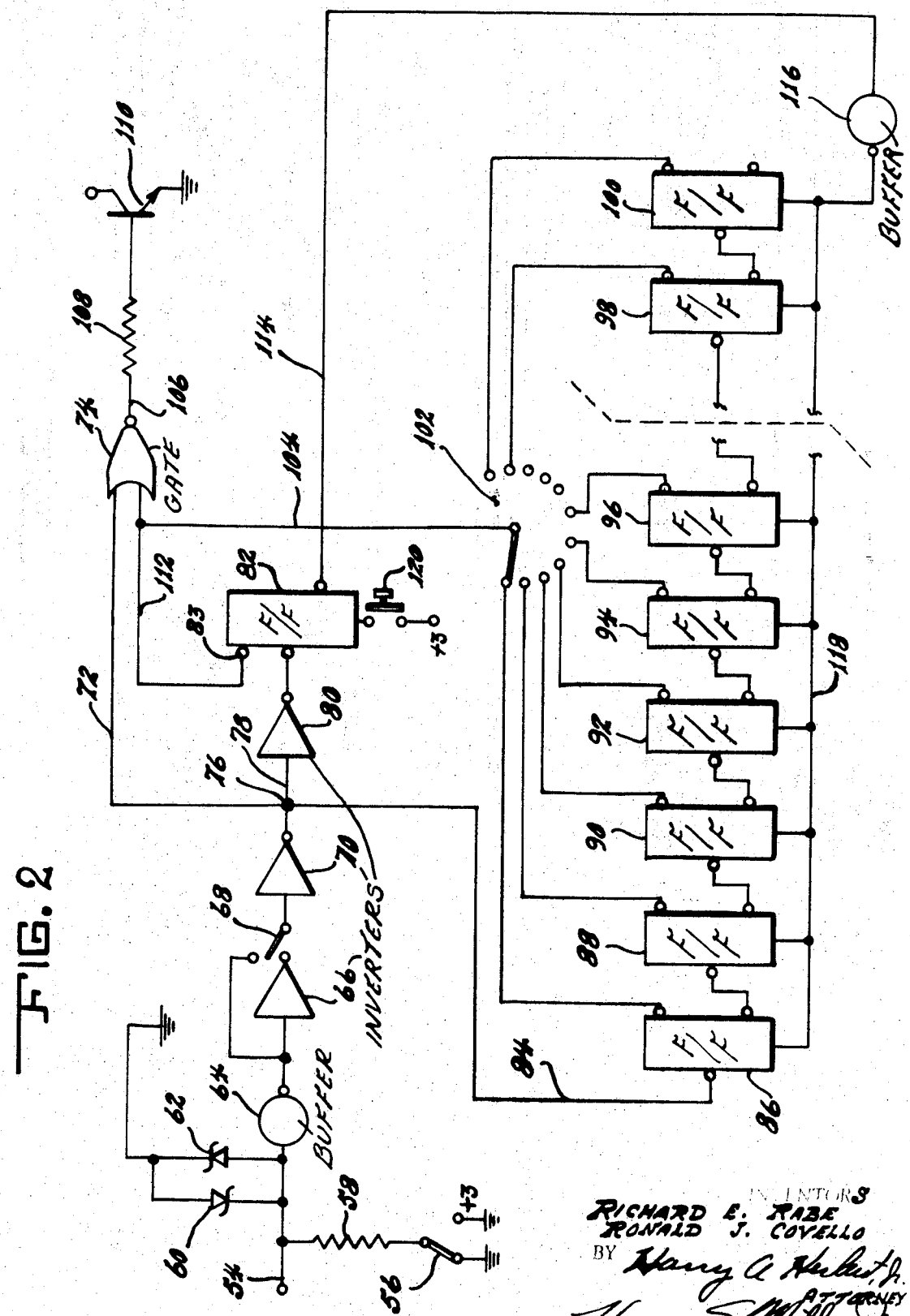

HIGH-SPEED SYNCHRONOUS SAMPLER CONTROL TIMER

BACKGROUND OF THE INVENTION

This invention relates generally to electronic timers and more particularly to a synchronous control timer for operating electrical devices.

In the art today there exists the need for a relatively high-speed synchronous timer. In many fields, including that of oscilloscope photography, it is of the utmost importance that a completely automatic system be available, a system which will take into account the variation in pulse widths and pulse spacing and still produce the desired result.

Currently existing techniques and apparatus for controlling cameras adapted for taking oscilloscope photographs, for example, consist mainly in the use of a timer which will not provide synchronous operation with the pulses, or manual operation which is relatively slow and requires an operator. Some cameras have been advanced to a point where they are in synchronism with the deflection circuitry of the cathode ray tube and photograph every sweep.

In general, present methods and devices available for oscilloscope photography result in pictures which may be several sweeps long, start sometime during the middle of a sweep, and stop sometime during the sweep. Many of the prior art devices are frequency dependent and subject to errors caused by minor variations in frequency. There is no strictly synchronous operating oscilloscope equipment presently available in the prior art.

SUMMARY OF THE INVENTION

The instant invention, while disclosed specifically with use in oscilloscope photography, may be utilized in similar sampling control operation where a plurality of pulses are involved. The synchronous sampler control timer of this invention operates to count pulses and derive a control signal. The pulses may be output gate pulses from an oscilloscope or they may be pulses produced by a sensor of products as they pass in an assembly line as a quality control check.

When a preset count is reached, the invention will operate a circuit designed to be controlled for either the duration of the input pulse or the space between two input pulses regardless of width. The preset count is determined by a switch means and selection between pulse width and pulse spacing is similarly performed by switch means.

The acceptable pulse-repetitive rate of the invention is equal to or less than 4 million pulses per second and the timer does not operate as a function of frequency. In the event of relatively slow operation, a circuit is provided including a relay for the circuit output to provide isolation between the controlled device and the timer. In the event relatively fast operation is required, that is, faster than relay response, the relay can be omitted.

The synchronous sampler control timer described herein provides a new and novel reset circuitry once it has performed its function. The device utilizes an input pulse to reset the counter after the desired output has been accomplished. As an example, if it were desired to perform a function after 4,097 input pulses, the system would not be off for 4,097 input pulses then turn on for 4,097 input pulses, as in conventional timers. Rather, the timer is capable of remaining off for 4,097 pulses, turn on for one input pulse or, alternatively, the space between two pulses, then turn off for 4,097 more pulses or any selected combination of pulses.

This invention has the unusual capability of being able to operate over a range from one operation per input pulse to one operation per 4,097 pulses and all steps of $2^n + 1$ in between. If desired, by utilizing the same principle disclosed herein, it is possible to enlarge the capability of the invention by merely adding the appropriate components.

The invention, when used in the field of oscilloscope photography, enables a picture to be taken of an entire selected oscilloscope sweep or series thereof. Prior art timing devices provide a burst of current or kick when the pulse enters thereby opening the shutter of the camera, then through a mechanical clock timer the shutter is held open for a predetermined length of time after which the shutter closes.

It is therefore an object of this invention to provide a new and improved synchronous control timer.

It is another object of this invention to provide a timer circuit that will reset automatically.

It is a further object of this invention to provide a synchronous timer that is not frequency dependent.

It is still another object of this invention to provide a timer that will count a broader range of pulses than any hitherto known.

It is still a further object of this invention to provide an electronic timer that is truly synchronous in operation.

It is another object of this invention to provide a synchronous timer that will count pulses or the space between input pulses.

It is another object of the invention to provide a timer that is relatively unaffected by unwanted input signals.

It is another object of this invention to provide a control timer which will operate independent of pulse width.

It is another object of this invention to provide a synchronous control timer that may be switched in opposed modes for a different number of pulses.

It is another object of the invention to provide a timer which is economical to produce and utilizes conventional, currently available components that lend themselves to standard mass-production manufacturing techniques.

These and other advantages, features and objects of the invention will become more apparent from the following description taken in connection with the illustrative embodiment in the accompanying drawings, wherein:

DESCRIPTION OF THE DRAWINGS

FIG. 2 is a circuit diagram of the logic circuit incorporated in the invention.

DESCRIPTION OF THE PREFERRED EMBODIMENT

Figure 1:
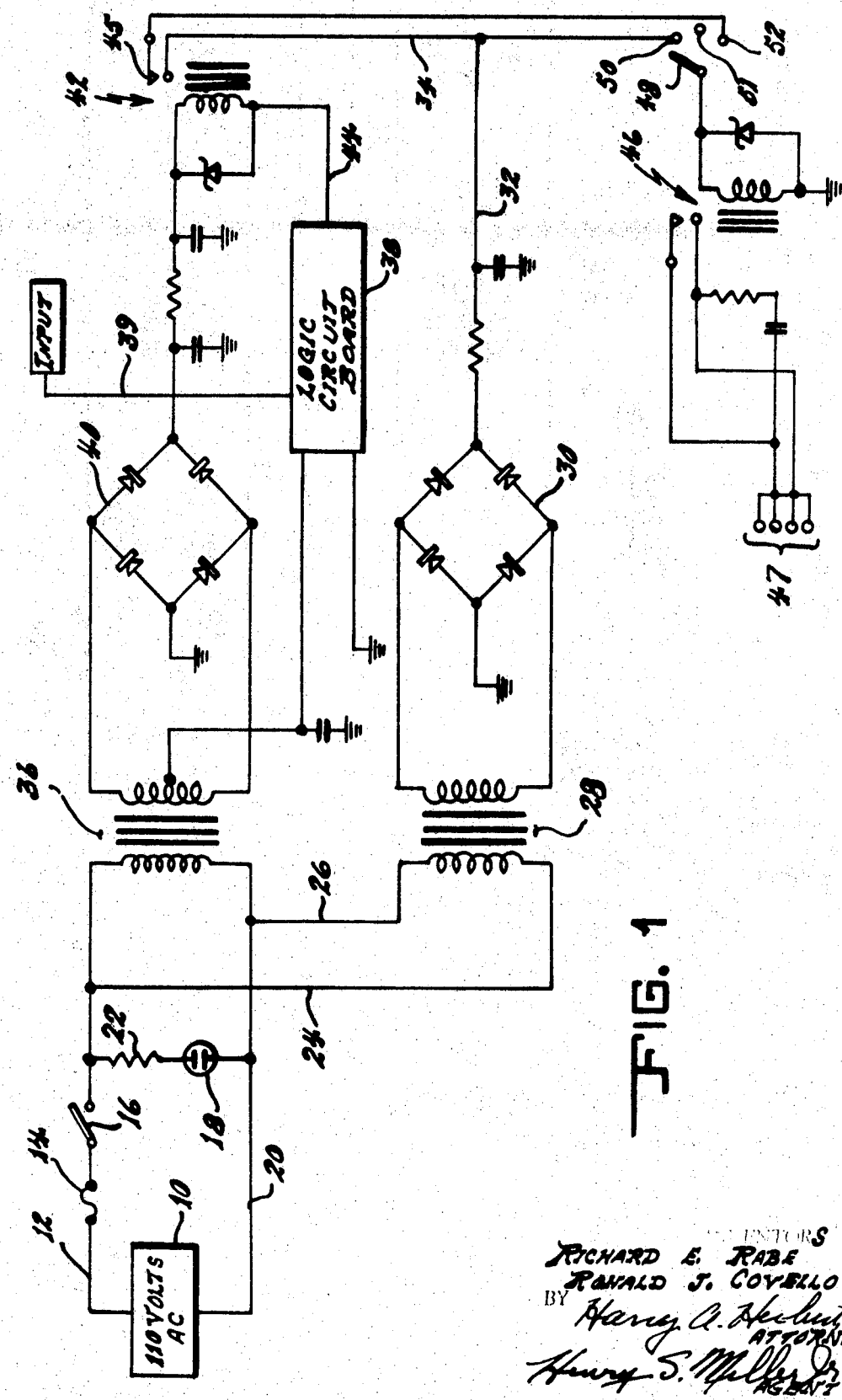
FIG. 1 is a circuit diagram of the main embodiment of the invention.

Referring now to FIG. 1, a standard 110 volt source of alternating current is provided for the invention at 10, the line 12 contains a fuse 14 and an on-off switch 16. A pilot light 18 is connected between the input leads 12 and 20 in series with the current-limiting resistor 22. Lines 24 and 26 are connected to input lines 12 and 20 respectively and feed the transformer 28 where the voltage is reduced to 24 volts. The bridge circuit 30 produces direct current and is connected to the line 34 via line 32.

A transformer 36 is connected to the input lines 12, 20 and reduces the voltage to 6.3 volts. A center tap from the transformer supplies the logic circuit board 38 with a 3 volt supply of direct current. The bridge circuit 40 converts the 6.3 volts of input to direct current and feeds the relay shown generally at 42. An output is provided via line 44 from the logic circuit board 38. The contacts 45 control the auxiliary mode select and isolation relay 46 through three-way mode switch 48. In the up position, that is, contact 50, the timer is on and in the manual mode. In the middle position (contact 51) the timer is off and in the lower position contact 52 the timer is on the automatic mode. The terminals 47 connect the timer to the apparatus to be controlled, for example, an oscilloscope camera. Signal input to the timer enters the logic circuit 38 via line 39.

In FIG. 2 is shown in detail the logic circuit board 38 of FIG. 1. The input signal enters through line 54 where it may be conditioned by switching between ground or adding 3 volts of bias through the resistor 58. The Zener diodes 60, 62 further aid in the conditioning process as does the buffer 64. The signal is inverted by the inverter 66 which may be bypassed by the switch 68. The signal is further inverted at 70.

The advantage found by the inclusion of the bypass switch 68 is in the utility of the timer disclosed herein. The operator is now given the opportunity to use the trailing edge of one input pulse and the leading edge of the next input pulse as the leading and trailing edge of the signal pulse, thereby counting the spaces between pulses.

The conditioned input signal leaves the inverter 70 and is sent via line 72 to the coincident gate 74. The signal is further sent from junction 76 via line 78 to the inverter 80 and thence to the trigger terminal of the flip-flop 82. In addition, the signal is sent from the junction 76 through line 84 to the trigger terminal of flip-flop 86. The series of flip-flop circuits 86 to 100 inclusive are arranged to function as a conventional binary counter. It should be noted that the capability of the timer is limited only by the number of flip-flop circuits included. More or less may be used without destroying the overall concept of the device. The output of each flip-flop is directed in the well-known manner to the trigger terminal of each subsequent flip-flop. The reciprocal output of each flip-flop is directed to the selector switch 102 where the desired count from the binary counter is manually selected.

The signal from the switch 102 is fed by line 104 to the And gate 74. When the signal from the switch and the input signal arriving from line 72 are both zero a voltage from 74 proceeds along line 106 through matching resistor 108 and to transistor 110 which in turn triggers the relay 42 (shown in FIG. 1).

The signal emanating from the switch further follows lead 112 to the flip-flop 82 and the "set" terminal 83. The output of the flip-flop 82 follows line 114 to the buffer 116 from which a line is sent to each flip-flop and provides a clearing or reset action.

The initial condition for all flip-flops is for the output to be zero and the reciprocal output to be one. Flip-flop 82, if enabled, toggles on the zero to one transitions of the conditioned input signal, while flip-flop 86 toggles on the one to zero transition of the input signal. Flip-flops 86 through 100 are always enabled except when a one is present on the clearing input, line 118.

The flip-flop 82 is enabled when the counter reaches the desired count, prior to this it is disabled by a one input in the set terminal 83. When the input signal changes from one to zero on the desired count, the counter enables the coincidence gate 74 and flip-flop 82. Since the input signal is zero, the gate 74 turns transistor 110 on thus operating the relay which in turn controls the camera shutter or other device. At the next zero to one transition of the input signal flip-flop 82 will toggle, that is, the output will go to the zero state and the buffer 116 will go to a one state thereby clearing the counters back to their initial condition.

The counter is held in the clear condition until the next zero to one transition of the input signal.

To further illustrate the operation of the system

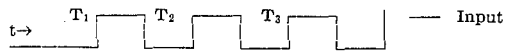

if $T_1$ is the desired count selected by the switch 102 in FIG. 2, then at $T_1$ the relay 42 (FIG. 1) closes and flip-flop 82 is enabled. At $T_2$ the relay opens and flip-flop 82 toggles, thereby sending a reset pulse out over line 114, clearing the counter back to the initial condition. Subsequently at $T_3$, flip-flop 82 toggles again thereby enabling the counter and beginning the cycle over again.

This invention is provided with a means for manual reset in the form of push button 120 thereby allowing a 3-volt source of direct current to clear the counter.

Having thus described our invention in adequate detail, we claim the following as our invention:

We claim:

1. A synchronous timer comprising: a source of alternating current; a first voltage-reducing means and rectifying means connected in series to said source; a second voltage-reducing means and rectifying means connected in series to said source; counting means adapted to count signal pulses connected to the first voltage-reducing means; a first relay connected to the counting means and controlled thereby; a mode control switch; a second relay operatively connected between the first relay, the second voltage-reducing means and the mode control switch and output means controlled by said first and second relays whereby a device associated with said output means may be activated or deactivated as a timed function of the input signal.

2. A synchronous timer as claimed in claim 1 wherein the counting means includes: signal-conditioning means; a binary logic circuit connected to the conditioning means; a selector switch associated with the binary logic circuit for selecting a desired count; a coincident gate; switching means connected to the logic circuit and the coincident gate whereby the counting means will produce an output upon the reaching of a preselected input signal count; a multivibrator connected to the coincident gate, and means connected between the multivibrator and logic circuit for automatically resetting the counting means after the said signal is produced.